United States Patent [19]

Kempf

[11] 4,168,912

[45] Sep. 25, 1979

[54] OPTICAL COMPARATOR

[76] Inventor: Paul S. Kempf, 842 Juanita, Solana Beach, Calif. 92075

[21] Appl. No.: 895,245

[22] Filed: Apr. 10, 1978

Related U.S. Application Data

[63] Continuation-in-part of Ser. No. 706,676, Jul. 19, 1976, Pat. No. 4,105,340.

[51] Int. Cl.² ............................................. G01B 9/08
[52] U.S. Cl. ...................................... 356/394; 350/30
[58] Field of Search ................ 356/71, 164, 165, 166, 356/167, 168, 391, 392, 393, 394, 388; 350/30

[56] References Cited

U.S. PATENT DOCUMENTS

| | | | |
|---|---|---|---|
| 1,974,654 | 9/1934 | May | 356/166 |
| 3,695,769 | 10/1972 | Mason | 356/168 |
| 3,744,917 | 7/1973 | Craig | 350/30 |
| 3,892,491 | 7/1975 | Kanode | 356/168 |

FOREIGN PATENT DOCUMENTS 2530750  1/1977  Fed. Rep. of Germany ........... 356/166

*Primary Examiner*—John K. Corbin
*Assistant Examiner*—R. A. Rosenberger
*Attorney, Agent, or Firm*—Brown & Martin

[57] ABSTRACT

An optical comparator which provides mirror images of a pair of similar objects being compared. One image is visible to each eye and, in the combined view, the images are of comparable portions of each object on opposite sides of a common separation line, so that any differences are readily apparent. Images of the two lighted objects, which are held in related alignment on an adjustable holder, are projected in separate optical paths through a system of reflectors to produce enlarged real images visible from a fixed eye position. A prism in one optical path inverts and reverts that image to obtain the back to back mirror images. When the holder is moved the objects are scanned across their faces and the comparable elements in the images appear to blend into or separate out from each other at the dividing line, depending on the direction of motion.

11 Claims, 10 Drawing Figures

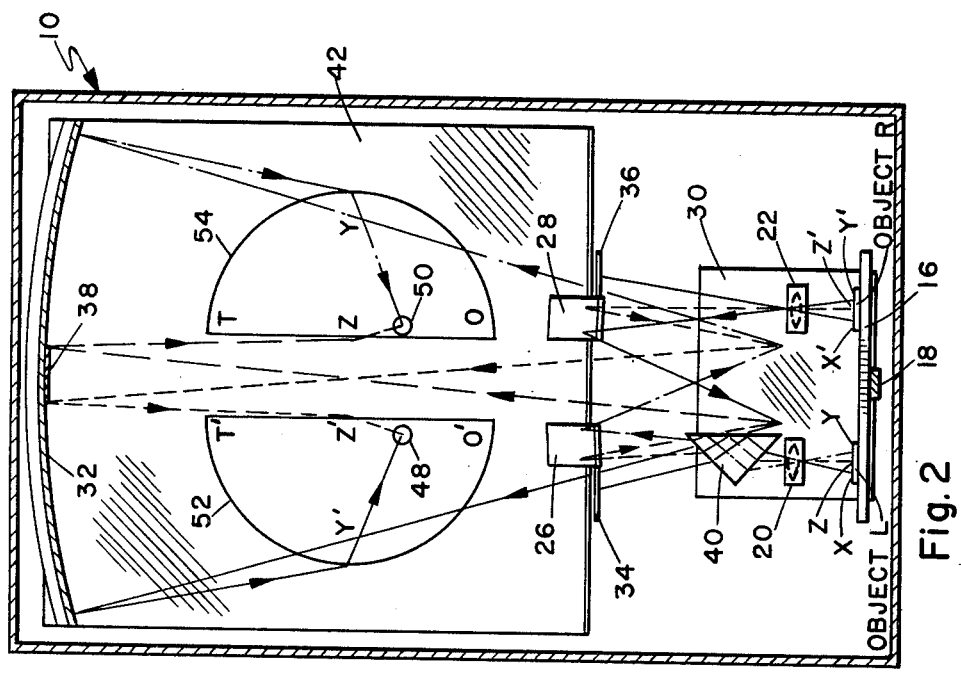
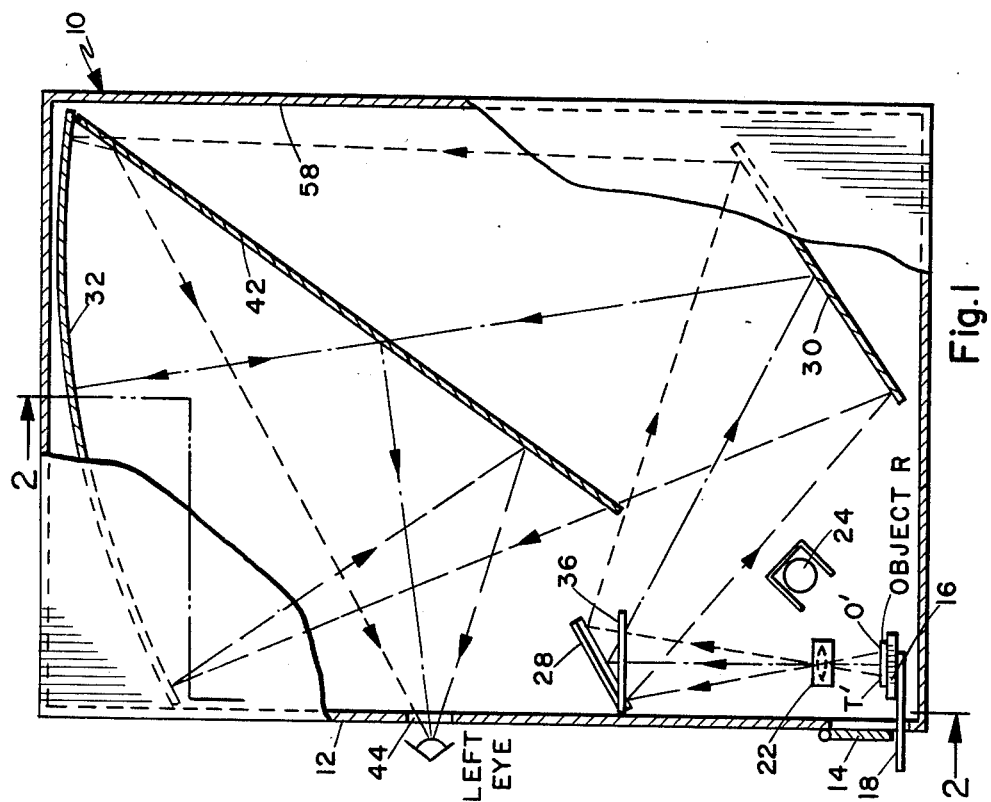
Fig.2
Fig.1

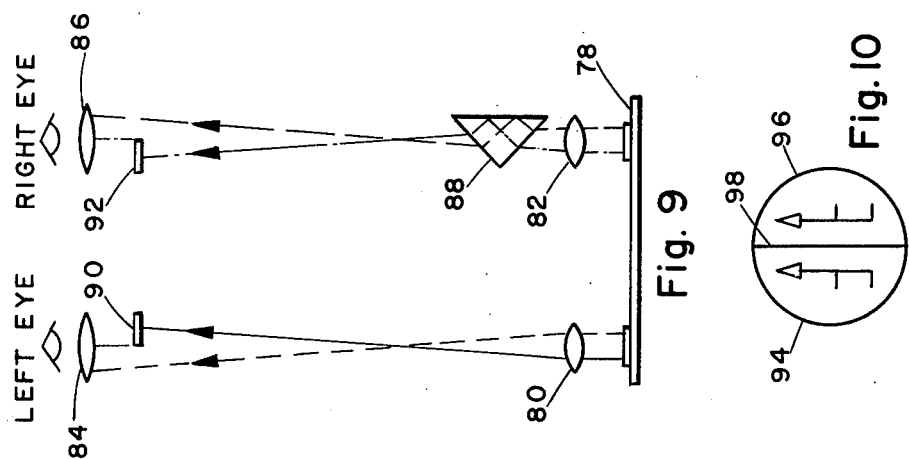
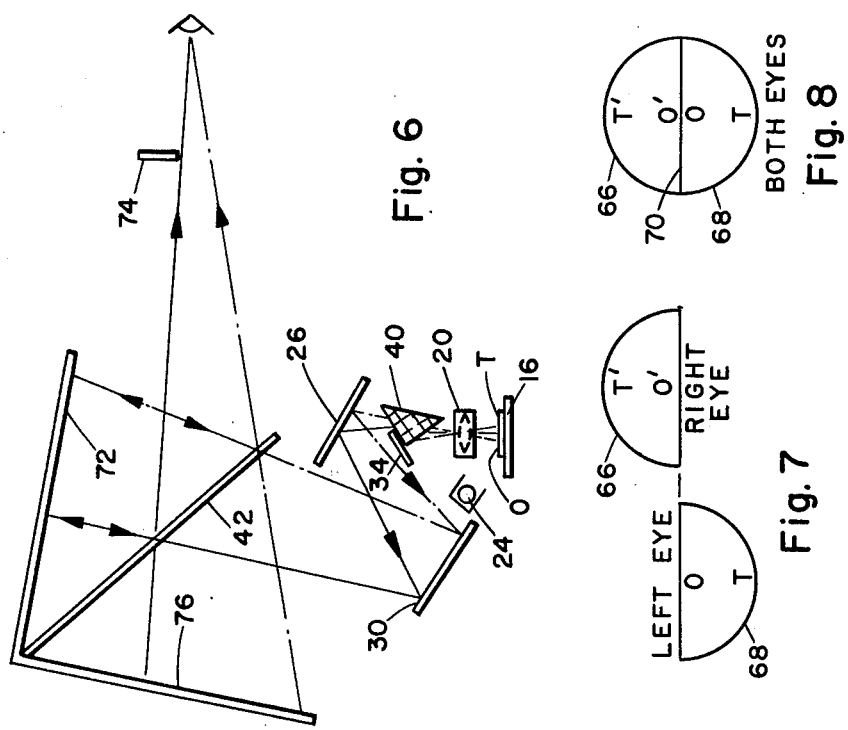

OPTICAL COMPARATOR

This application is a continuation-in-part of U.S. application Ser. No. 706,676, filed July 19, 1976, now U.S. Pat. No. 4,105,340 entitled "Optical Comparator and Inspection Apparatus."

BACKGROUND OF THE INVENTION

An optical comparator for producing mirror images of two objects to be compared is shown and described in my co-pending application Ser. No. 706,676, filed July 19, 1976 and entitled "Optical Comparator and Inspection Apparatus." This device uses an opaque projector technique to produce mirror images of the two objects, one above the other, on a back projection screen. The apparatus is primarily suited for examining reasonably large objects, such as printed circuit boards and the like, at low magnification. Due to the back projection arrangement, a slight grain effect is inherent in the screen but is not objectionable with the type of articles for which the apparatus is used.

For comparison of very small objects at high magnification a different technique is required. In the electronics industry, very large numbers of components known as hybrids are used. These are usually in the form of a small substrate, of ceramic or other such material, carrying intricate printed circuitry to which various microcircuit chips are attached by very fine wires. Other discrete components, such as resistors, capacitors and the like may also be included, but the entire assembly is very small and requires specialized production techniques. Hybrids may cost from a few dollars to several thousand dollars each and very careful inspection techniques are necessary to insure consistent quality.

Due to the large number of hybrids used, individual inspection with reference to wiring diagrams, photographs and the like can be time consuming and costly. Blink comparators have been used, but these rely on vision persistence and are very tiring to the eyes.

For large production runs of hybrids, automatic testing equipment can be used. However, this is very expensive and is limited to the specific use for which it is designed. Also, if a fault is detected, visual inspection is still required to determine the reason.

SUMMARY OF THE INVENTION

The optical comparator described herein facilitates rapid and precise inspection of a production object in direct mirror image comparison with a master object, so that any differences are readily apparent. The master and production objects are mounted in relative alignment on a holder, which is movable in the focal plane of a pair of projection lenses spaced to project images of the two objects in separate optical paths. Each optical path includes multiple reflectors, with a final image reflected on to a beam splitter which directs the image to an eye position. One optical path includes a prism to invert and revert the image, the result being side by side mirror images in the form of enlarged real images, each visible to one eye. The natural visual properties of the eyes combine the two images into a composite image with a central dividing line, with each half remaining distinct. Light stops are used to cut off each optical path to provide the common dividing line at the appropriate position on each object.

In the combined image the comparable components of the two objects are in adjacent alignment at the division, and any differences are immediately apparent. By producing greatly enlarged real images the definition is very high and extremely small details are clearly visible. As the holder is moved the objects are scanned across their faces, the various components in the images appearing to merge into or diverge from the center line, depending on the direction of motion. It has been found that by viewing each image with one eye and having a clear separation line, near which the vision can be concentrated as the images move, any discrepancies between the master and production objects stand out vividly. As a result, each object can be processed quickly, making individual inspection very practical.

The primary object of this invention, therefore, is to provide a new and improved optical comparator.

Another object of this invention is to provide an optical comparator which produces side by side mirror images of two objects to be compared, each image being visible to one eye and aligned so that the two images appear to join at a common dividing line.

Another object of this invention is to provide an optical comparator in which the two objects to be compared are held on a common holder, for moving simultaneously across individual optical projection paths, one path having means for reverting the image.

A further object of this invention is to provide an optical comparator in which the images are presented in such a manner that any discrepancies between the images are immediately apparent.

Other objects and advantages will be apparent in the following detailed description, taken in conjunction with the accompanying drawings, in which:

FIG. 1 is a right side elevation view of the apparatus, with portions cut away to show the optical path to one eye.

FIG. 2 is a sectional view taken on line 2—2 of FIG. 1.

FIG. 6 is a diagrammatic side elevation view showing an alternatire reflector arrangement.

FIG. 7 shows the separate eye images produced by the apparatus of FIG. 6.

FIG. 8 shows the combined images of FIG. 7.

FIG. 9 is a diagram of the individual eye, mirror image technique applied to a microscope.

FIG. 10 shows an image as viewed in such a microscope.

DESCRIPTION OF THE PREFERRED EMBODIMENT

Figure 4:
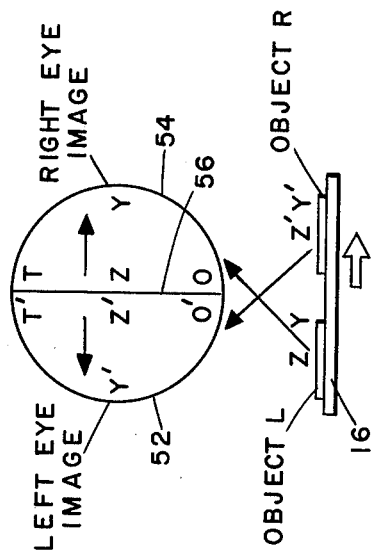
FIG. 4 is a diagram showing the relationship of the images to objects being compared.
Figure 5:
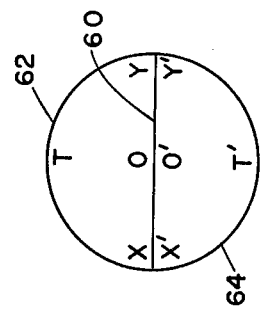
FIG. 5 shows an image with an alternative horizontal dividing line.

The apparatus is enclosed in a housing 10 of any suitable configuration to shield the optics from stray light. Supports and brackets for the optical components are omitted for clarity, since any convenient arrangement may be used.

The front panel 12 of housing 10 has a door 14 in the lower portion for access to the holder 16, on which the objects to be compared are secured in spaced relation. For purposes of description the left and right hand objects will be referred to as object L and object R. As illustrated, the holder 16 has a handle 18 which projects from the housing for moving the holder and thus scanning the objects in their respective optical systems. The above mentioned co-pending application describes a tray for holding and clamping two objects to be compared in precise alignment and spacing. Coincidence of the images is adjusted by the relative positioning of the objects in the holder, but once set, all subsequent objects will be correctly positioned. Also described is means for precisely moving the tray in two orthogonal directions to obtain the required scan of the objects. The structure is readily adaptable on a smaller scale to the present apparatus.

Spaced above the positions of the two objects are left and right projection lenses 20 and 22, respectively, which may be provided with any suitable focusing means. The objects are illuminated by a light source 24 to project images upwardly through lenses 20 and 22 to left and right first mirrors 26 and 28, respectively. Mirrors 26 and 28 are inclined upwardly and rearwardly to direct light to a second mirror 30 extending across the lower rear portion of the housing. Mirror 30 is inclined to direct the light upwardly to a final reflector which is a concave, substantially spherical mirror 32 extending across the top of the housing.

First mirrors 26 and 28 are also inclined inwardly to direct the light toward the central portion of mirror 30, as in FIG. 2. From mirror 30 the optical paths then cross over to the opposite sides of concave mirror 32, which provides better positioning of the final images and simplifies separation. Light stops 34 and 36 are fixed at the sides of mirrors 26 and 28 to cut off about half of each light beam and provide a common dividing line between the images. A light stop 38 across the center of concave mirror 32 maintains the separation. A prism 40 is mounted above lens 20 to invert and revert the image, as indicated in FIG. 2.

The light reflected upwardly from mirror 30 passes through a beam splitter 42, inclined forward and downward from the upper rear corner of the housing 10. Light reflected downwardly from concave mirror 32 is reflected from the upper surface of the beam splitter through eye openings 44 and 46 in front panel 12, to the eye positions 48 and 50 indicated in FIG. 2. If lenses 20 and 22 are circular and unmasked, the left and right images 52 and 54 will be semi-circular as shown. If required the optical paths could be masked to provide images of rectangular or other configuration.

Due to the cross over of the optical paths, the left eye actually sees the image 52 of object R, as in FIG. 1. Similarly, the right eye sees the image 54 of object L, as in FIG. 3, this image being reverted relative to image 52.

With reference to FIG. 2, the lines indicating the optical paths are drawn for individual identification to allow tracing of the paths. The objects and their images are also correspondingly lettered to show the relationships. It can be seen that the objects L and R are similarly oriented in holder 16. The image of the left hand portion X'-Z' of object R is cut off by light stop 36, so that only the image of the right hand portion Z'-Y' is projected. Due to the reverting effect of prism 40, the left hand portion X-Z of object L is cut off by light stop 34 and only the image of portion Z-Y is projected.

The particular number of reflections in the optical system cause the images to be inverted with respect to the orientation of the objects relative to the eye position. The vertical inverting is inconsequential since, if the object carries printed matter which must be read, the object can be inverted in the holder. However, an additional reflection stage could be added, if desired, to erect the images. In each image the light stops cut off the image with a straight inner edge. The eyes naturally tend to combine the images, resulting in the composite image indicated in FIG. 4, with a common dividing line 56.

If the holder 16 is moved to the right, in the direction of arrow 58 in FIG. 4, the image of portion Y' of object R in image 54 will move outwardly. In the reverted image 54, the image of portion Y of object L will also move outwardly. Thus, the two mirror images will appear to diverge from dividing line 56. If holder 16 is moved in the opposite direction the images will converge at line 56. Along the dividing line, corresponding components and elements on the master object and production object are immediately adjacent and any discrepandy is very obvious. An error thus found can be noted, or the component can be marked by reaching through door 14 with an appropriate marking instrument. When the holder 16 is moved from front to rear, the images will move vertically to scan components along the dividing line. By moving the holder horizontally in one direction, shifting the image vertically, then reversing the horizontal motion, the entire surface of an object can be scanned against the master very rapidly.

Since the image is formed on the beam splitter and appears to be projected in space behind the beam splitter, the inner surface of rear wall 58 is preferably matt black to avoid distracting reflections. In fact, the entire interior of the housing may be black to minimize internal reflections.

By making each image visible to only one eye, the separation is very sharp and fine details are distinct. It has been found that the images blend very well at the dividing line for most people. In some instances it may be necessary to provide means at one eye opening to adjust for an individual's interocular spacing, the techniques being well known.

For most purposes the vertical separation will be the most convenient. However, if a horizontal dividing line is required, as at 60 in FIG. 4, the prism 40 and light stops 34, 36 and 38 may be rotated 90 degrees to provide upper and lower images 62 and 64.

Figure 3:
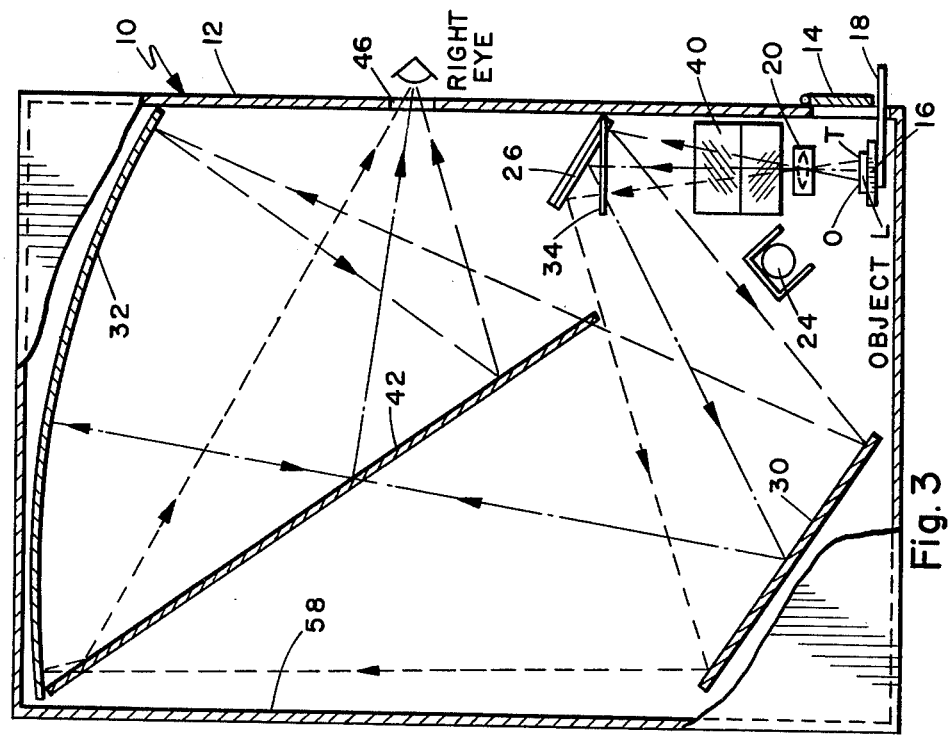
FIG. 3 is a left side elevation view, with portions cut away to show the optical path to the other eye.

A modified optical system is illustrated in FIG. 6. The view is comparable to FIG. 3, but with the prism and light stops arranged to provide upper and lower images 66 and 68 in FIG. 7. The images are shown combined in FIG. 8 with a dividing line 70. Elements corresponding to those in FIG. 3 are similarly numbered for simplicity.

Instead of a concave mirror, the upper reflector is a retroreflective screen 72, such as manufactured by 3M Company. A light stop 74 forward of the beam splitter 42 provides a sharp separation of the upper and lower images. The optical path for the other eye would, of course, be similar but without the prism. Back panel 76 may be matt black, or could be a retroreflective screen to brighten the image. While the screen material may cause some loss of sharpness, the arrangement may be suitable for some purposes. The individual eye to image relationship is retained, so that accurate comparison is facilitated.

In FIG. 9 the individual eye to image relationship is shown applied to a microscope for use at high manification. The two objects to be compated are mounted on a holder 78 under the two objective lenses 80 and 82 of the microscope, and are viewed through eyepieces 84 and 86. A prism 88 is placed in the optical path between objective 82 and eyepiece 86 to revert one image, and light stops 90 and 92 are used to limit the field of view and provide a clear dividing line between the images. Each eye thus sees a similar portion of one of the objects. The resultant image is shown in FIG. 10, in which a left image 94 and a right image 96 are joined at a dividing line 98. This arrangement may be desirable for comparing microcircuits and chips, which require magnifications of 100 or more to show the individual elements and conductors clearly.

In each configuration described there are two distinct optical paths. The image in a particular path can only be seen by an eye in that path and the details in that image are observed by only one eye. Thus, while the eyes tend to blend the images at a common dividing line, the details in each half of the image are apparent only to one eye and stand out very distinctly. It has been found that discrepancies between the images viewed in this manner are much more obvious than if both images were visible to both eyes, as in a screen projection type of viewing system.

Having described my invention, I now claim:

1. An optical comparator, comprising:
   a holder having means for holding a pair of similar objects to be compared in spaced corresponding alignment;
   an optical system having means for viewing said objects in separate optical paths at individual eye positions, each object being visible to one eye only;
   inverting and reverting means in one optical path for inverting and reverting the image of one object relative to the other;
   and light stop means in each optical path obstructing a similar portion of each image along a straight dividing edge with the dividing edges of the two images being adjacent and parallel in the combined view.

2. An optical comparator according to claim 1, and including a housing in which said optical system is contained;
   said optical system having a pair of projection lenses spaced to project images of the two objects in the separate optical paths;
   said holder being movably mounted in said housing for movement substantially in the focal plane of said lenses;
   and a source of illumination mounted in the housing to illuminate the two objects.

3. An optical comparator according to claim 2, wherein said housing has spaced eye openings;
   said optical system including reflecting means for directing images from said lenses to said eye openings individually.

4. An optical comparator according to claim 3, and including a beam splitter inclined across the optical paths and confronting said eye openings;
   said reflecting means directing the images through said beam splitter and including a final reflector for returning the images to the surface of the beam splitter for forming the visible images thereon.

5. An optical comparator according to claim 4, wherein said final reflector is a concave mirror.

6. An optical comparator according to claim 4, wherein said final reflector is a retroreflective panel.

7. An optical comparator according to claim 6, and including a retroreflective back panel behind said beam splitter relative to said eye openings.

8. An optical comparator according to claim 4, wherein said housing has a lower front portion in which said holder is mounted and extends across the front of the housing, said final reflector being in the upper portion of the housing;
   said lenses being positioned above said holder;
   said optical system including first mirrors mounted individually above said lenses, a second mirror mounted below said beam splitter to receive images from said first mirrors and direct the images upwardly through the beam splitter to the final reflector.

9. An optical comparator according to claim 8, wherein said light stop means includes light stops adjacent said first mirrors to limit the portions of the images reaching the first mirrors.

10. An optical comparator according to claim 9, wherein the objects are held at opposite ends of said holder in left and right positions;
    said first mirrors being inclined to direct images inwardly toward each other on the second mirror so that optical paths cross over between the second mirror and the final reflector, whereby the image of the left object is visible only to the right eye and the image of the right object is visible only to the left eye.

11. An optical comparator according to claim 10 and including a light stop on said final reflector for separating the images thereon.

* * * * *